United States Patent Office 3,360,943
Patented Jan. 2, 1968

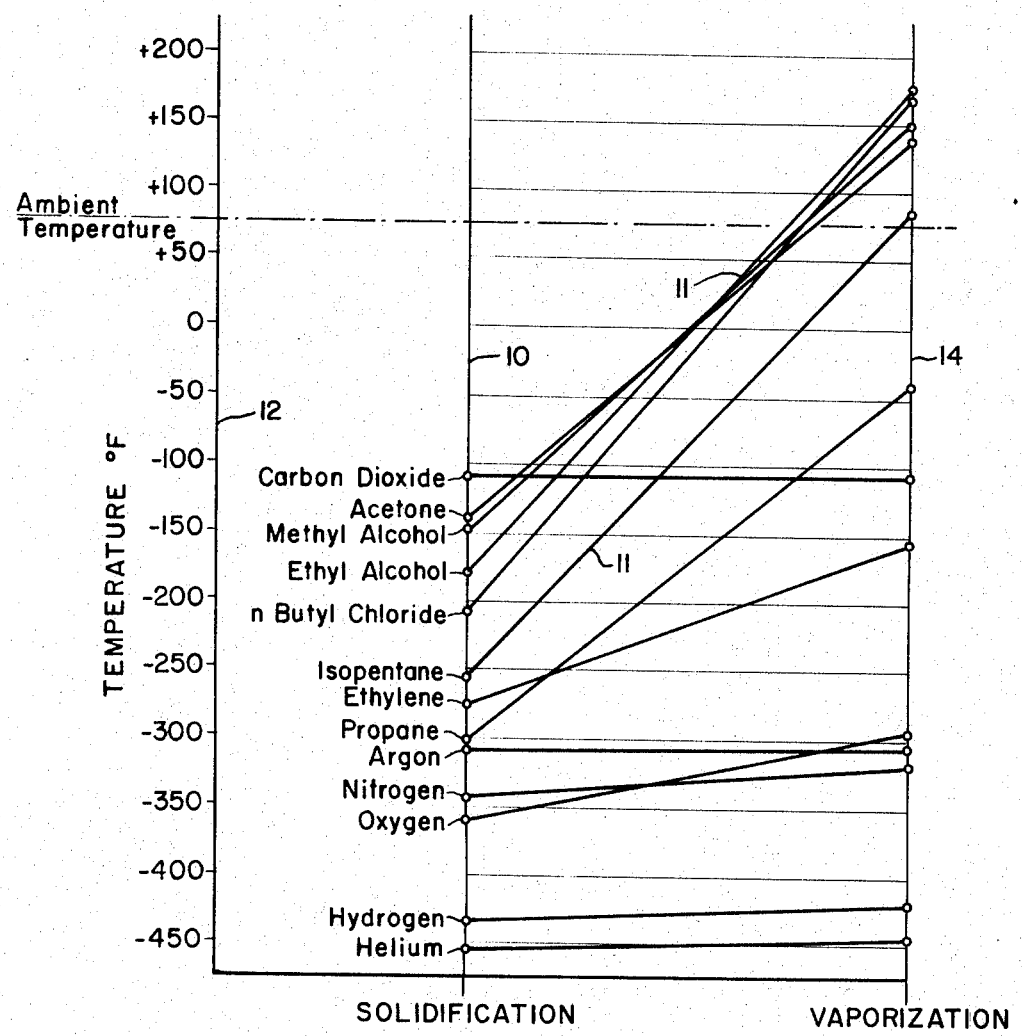

3,360,943
SOLIDIFYING LIQUID AT SUBZERO TEMPERATURES
William J. Schoenfeld, Pittsburgh, William J. McElhaney, Imperial, and William A. McNeish, Bethel Park, Pa., assignors to Cyclops Corporation, a corporation of Pennsylvania
Filed Oct. 27, 1964, Ser. No. 406,845
2 Claims. (Cl. 62—10)

This invention relates to improvements in temperature control and relates in particular to an improved method for obtaining and maintaining a liquid media at a low temperature.

The cryogenic properties of materials are becoming of increasing importance in industrial applications and space technology. Over the past few years, low temperature testing requirements have increased at a rapid pace.

The mechanical properties of material at specified low temperatures must be frequently obtained by conducting standard test procedures in temperature environments ranging from ambient to −463° F. Conventional practice for making low temperature determination includes the practice of adding Dry Ice (carbon dioxide in solidified form) to a liquid which has a low freezing temperature and conducting the mechanical tests within the cooled liquid. For example, a property of major importance for refractory alloys is the ductile brittle transition temperature as measured by bend tests. Such bend tests are now frequently conducted within a Dry Ice-acetone mixture. The freezing point of acetone is −139° F. By placing Dry Ice in acetone, temperatures can be obtained from ambient to a low range of from about −90° F. to −108° F. (dependent on the insulating efficiency of the container). At this low temperature, multiple bend tests can be conducted rapidly since the bend die and punches are maintained at test temperature by immersion in the cooling fluid and test specimens equalize at temperature very rapidly. By using this method, the test rate may be further increased by placing several specimens in the fluid container during testing so that they may be transferred under the fluid to the test die while at testing temperature.

The conventional use of Dry Ice in acetone though rapid, simple and preferred within the limits of its operative range is limited in practical application to test temperatures located at the lower end of the operative range of this particular mixture. Violent boiling of the Dry Ice occurs at nearly all of the intermediate temperatures above the low temperature range of from about −90° F. to −108° F. due to vaporization of the Dry Ice. Such boiling interferes with the testing and makes it difficult to maintain a constant temperature, therefore, it is most practical to use this system as or near the lowest attainable temperature.

Another conventionally employed method for cryogenic testing requires the use of a nitrogen-cooled test chamber. This method permits determinations to be carried out within the range of ambient temperatures to approximately −320° F. Gaseous nitrogen is supplied from a liquid nitrogen source to an insulated chamber in which testing is conducted. The insulated chamber contains the necessary fixtures and is provided with a thermocouple temperature control. A line from the bottled liquid nitrogen source conducts gaseous nitrogen into the test chamber and an automatic valve in this line is controlled by the temperature control unit. Following each test, this chamber must be opened to the atmosphere. After positioning a new specimen and closing the chamber, considerable time is lost while heat absorbed from the ambient room temperature is removed. A longer hold time is required in the gaseous nitrogen atmosphere to assure a uniform temperature in the specimen than when tests are conducted within cooled liquids. This method has a considerably broader temperature working range than the Dry Ice-acetone system, but is much more time consuming.

We have now discovered a test method whereby low temperature (below 32° F.) testing may be conducted within a liquid media while maintaining accurate temperature control at nearly any given subzero temperature. Liquid temperatures from ambient to about −459 °F. can be maintained. Test temperatures can be controlled over stable liquid ranges because there is no boiling at intermediate temperatures.

Although our method of temperature control in a low temperature liquid media is particularly useful for cryogenic testing, it may also be employed for other low temperature applications. For example, some alloy compositions are quenched to subzero temperatures from elevated temperatures during heat treatment to reach subcritical temperatures and prevent undesired phase transformations or to effect desired structures. The heat treatment of hardenable grades of chromium-nickel stainless steel may involve transformation by refrigeration to temperatures as low as −150° F. (see U.S. Patents 2,958,617 and 2,958,618). Such subzero treatments may be effected advantageously by quenching in a liquid media wherein particularly accurate temperature control is effected by the method of the present invention.

The accompanying single figure is a graph which illustrates the thermal properties of materials that are particularly useful in carrying out the method of the present invention.

In general, our invention comprises the cooling of a first material in its liquid state with a second material in its solid state. Both materials must have a liquid phase that encompasses the subzero temperature one wishes to reach and maintain, and the liquid phases of these two materials must be substantially soluble in one another. Additionally, the second material must have a temperature of solidification that is below the desired or preselected subzero temperature. Preferably these two materials are the same or substantially the same substances.

The preferred embodiment of our invention includes a preceding step wherein the second material is initially in a liquid or a vaporous state. This liquid or vaporous material is immersed in a third material that is in a liquid or vaporous state. The third material must have a temperature of vaporization that is below the solidification temperature of the second liquid. If the third material is in a liquid state, the second material will solidify or crystallize immediately upon being introduced into the third material whether the second material is in a liquid or vaporous state. If the third material is in a vaporous state, its temperature must be below the solidification temperature of the second liquid. Preferably all three materials are initially liquids, the second material first solidifying on contact with the third material.

By employing the method of our invention, the temperature of the cooling media or liquid is controlled over a broad liquid phase temperature range. Any specific temperature within this range can be readily maintained by proper proportioning of the solidified material within the liquid.

The graph of the single figure shows plots along a longitudinal line 10 of various materials which are particularly useful in practicing the method of the present invention. The plots of line 10 represent the individual temperatures of solidification of the various materials adjacently listed, and these individual temperatures may be ascertained by following a transverse path to the temperature scale 12. Plots along longitudinal line 14 represent the individual temperatures of vaporization of the materials along line 10 to which they are connected by lines 11. The temperature range covered by the graph is from about −463° F. (substantially absolute zero) to above ambient (including the vaporization temperature for ethyl alcohol +174° F.).

The liquid phase of a material whose temperature of solidification exceeds the temperature of vaporization of another liquid may be solidified by contacting the former with the latter. For example, ethyl alcohol solidifies at about −179° F. Argon, oxygen, nitrogen, hydrogen and helium are all liquids at temperatures below −179° F. Thus, solidified ethyl alcohol may be obtained by pouring liquid ethyl alcohol into one of the liquids argon, oxygen, nitrogen, hydrogen and helium.

The solidified material thus formed can be used as a coolant in its own liquid, and the temperature is controllable over its entire subzero liquid phase temperature range. Boiling such as occurs when Dry Ice is immersed in acetone does not take place. We have found that a mixture of liquid and solid ethyl alcohol can be controlled over the temperature range of from freezing to −170° F. A specified temperature within this range can be maintained by the proper proportions of the solid and liquid phases of the ethyl alcohol.

It will be noted from the graph that liquid helium has a temperature of vaporization that is below the temperature of solidification of all of the other materials. Thus, any of the materials listed along line 10 may be solidified by introducing them into liquid helium, including liquid hydrogen, oxygen, nitrogen and argon, and a specified temperature within the liquid range of any of the listed materials can be maintained in accordance with the method of the present invention by proper proportioning of solid and liquid phases. Carbon dioxide is shown to have a temperature of vaporization that is higher than the temperature of solidification of any of the other materials. For this reason, carbon dioxide does not make a suitable liquid for solidifying any of the materials listed (including acetone).

Hydrogen, oxygen, nitrogen and argon as well as helium are shown to be suitable liquids in which to solidify other materials listed (acetone, methyl alcohol, ethyl alcohol, n butyl chloride, isopentane, ethylene and propane). Argon and oxygen do not, however, make suitable liquids for solidifying nitrogen since the vaporization temperatures of these materials are higher than the solidification temperature of nitrogen.

The low temperature liquid need not be a pure material. For example, liquid air, which is commercially available, is a mixture that contains some of all of the above recited liquids (O, N, H, A and He) but may be employed in conjunction with the method of the present invention. The only requisite for employing such a mixture or any liquid is that its average temperature of vaporization is below the solidifying temperature of the liquid media one wishes to employ.

Hydrogen, nitrogen, argon, air and helium are preferred materials for use as low temperature liquids. With the possible exception of helium, all of these materials are commercially available in liquid form. Although liquid helium is not presently sold commercially, its increasing use in space technology assures its eventual commercialization. All these materials possess very low temperatures of vaporization and are therefore particularly useful when employed in conjunction with a liquid media having a broad range of temperatures wherein it remains in a liquid state.

The preferred and most convenient means for accomplishing the method of the present invention in solidifying or crystallizing a liquid, is effected by introducing the liquid into another liquid state material in the manner described above. However, such solidification may also be conveniently accomplished by introducing the liquid to be crystallized or solidified into a low temperature vapor. For example, as described above, one prior known practice for cryogenic testing is to supply gaseous nitrogen from a liquid nitrogen source to an insulated chamber in which testing is conducted. The temperature of the chamber may be lowered to −320° F. Materials in the liquid state such as ethylene, isopentane, etc., which have temperatures of solidification that exceed −320° F. may be solidified by introduction into such a chamber. The vapors of the low temperature materials employed to effect the desired solidification, such as the vapors of nitrogen hydrogen, oxygen, argon, helium and air must, of course, be at a temperature below the temperature of solidification of the liquid material one desires to crystallize and, accordingly, are preferably supplied directly from the material in its liquid state.

Further, it is possible, though not preferable, to introduce the material one wishes to crystallize into the low temperature liquid or vapor in a vaporous or gaseous state. Vapors of the material to be crystallized may be passed through the low temperature liquid or passed into a chamber that is supplied with low temperature gases drawn from such liquids such as the nitrogen chamber described above. Such vapors will precipitate the desired crystals when brought into contact with a low temperature material whose liquid state possesses a temperature of vaporization that is below the solidification temperature of the vaporous material one wishes to solidify. If the vapor is introduced into the vapor of a low temperature material, both the temperature of vaporization of such material and the temperature of the vapor itself must be below the crystallization or solidification temperature of the vaporous material to be crystallized.

For the purposes of the present specification and particularly the claims, we shall employ the word "fluid" to encompass materials in both their liquid and gaseous (or vaporous) states. It is acknowledged that such term has other meanings; however, such other meanings are not attached to this word as it is presently employed.

Particularly useful materials that may be employed in conjunction with the method of the present invention as the liquid media are those materials which have a liquid phase that extends from relatively low subzero temperatures to temperatures above ambient (about 70° F.). These materials are not only convenient in obtaining and retaining low temperatures but are also relatively stable at room temperatures and consequently can be easily stored. The graph of the single figure shows acetone, methyl alcohol, ethyl alcohol, n butyl chloride and isopentane to have such properties.

In acquiring and controlling a subzero temperature in a liquid media by introducing the solid phase of the same liquid, it is preferable to employ a single material rather than a mixture of materials. It is possible, however, and in some instances may be desirable to employ mixtures for this purpose, where the liquid state of each material is soluble in the other materials of the mixture, and all the ingredients are close to one another in respect to temperatures of solidification and vaporization. The solidification temperature of the mixture of materials must be above the vaporization temperature of the low temperature liquid employed. The mixture must also have a stable liquid phase at the desired subzero temperature.

Additionally it is possible, though not preferable, to employ a mixture of materials in the solid state in a liquid mixture of proportions that differ from the solid state mixture. A solid of a single material may be employed in conjunction with a liquid mixture and vice versa. One material in its solid state may be employed in another material in its liquid state. In each instance, however, such materials in their liquid state must be soluble in one another, and all such liquids must be stable at the temperature to be achieved.

As an example of the method of the present invention, a flask of liquid nitrogen was drawn from bulk storage, ethyl alcohol was introduced into the liquid nitrogen and solid ethyl alcohol crystals immediately formed. The solid ethyl alcohol was transferred to an insulated box containing liquid ethyl alcohol and a bend test die. The box had been initially chilled with liquid nitrogen. By the addition of solid and liquid alcohol, a suitable test fluid was developed with temperatures as low as −170° F. The temperature could be accurately controlled from −170° F. to ambient without difficulty.

As a further example of the method of the present invention, liquid acetone was solidified in liquid argon. These acetone crystals were then added to liquid acetone in bath containers. Temperatures were maintained in the bath between ambient and −135° F. The acetone remained very fluid down to −135° F. By addition of acetone crystals to the bath at a proper rate, temperatures between ambient and −135° F. could be maintained. Bend tests were conducted in this low temperature bath at various temperatures over this above range.

While we have described the present preferred embodiments of our invention, it is to be understood that it may be otherwise embodied within the scope of the following claims.

We claim:
1. The method of obtaining and maintaining a liquid at a subzero temperature, centigrade scale, comprising immersing a solidified first liquid having a temperature of solidification that is lower than said subzero temperature into a second liquid while maintaining said second liquid in liquid phase, said first and second liquids being soluble in one another and each having a stable liquid phase at said temperature, said first and second liquids being composed of a material selected from the group consisting of acetone, methyl alcohol, ethyl alcohol, n-butyl chloride, isopentane, ethylene, and propane.

2. The method of obtaining a liquid at a subzero temperature, centigrade scale, comprising:
  (a) immersing a first liquid into a second liquid, said second liquid having an average subzero boiling point temperature of vaporization that is below the temperature of solidification of said first liquid and is at a temperature below its boiling point when the first liquid is immersed therein so as to solidify said first liquid;
  (b) immersing said solidified first liquid into a third liquid in quantities to cool said third liquid to said subzero temperature while maintaining said third liquid in liquid phase, said first and third liquids being soluble in one another and each having a stable liquid phase at said subzero temperature,
said first and third liquids being composed of a material selected from the group consisting of acetone, methyl alcohol, ethyl alcohol, n butyl chloride, isopentane, ethylene, and propane.

References Cited

UNITED STATES PATENTS

| | | | |
|---|---|---|---|
| 2,067,676 | 1/1937 | Lees | 148—125 X |
| 2,445,294 | 7/1948 | Nelson | 62—384 X |
| 2,608,838 | 9/1952 | Rupp | 62—10 |
| 2,751,762 | 6/1956 | Colton. | |
| 2,927,101 | 3/1960 | Tegge et al. | |
| 3,224,208 | 12/1965 | Schlumberger et al. | 62—12 |

NORMAN YUDKOFF, *Primary Examiner.*

V. W. PRETKA, *Assistant Examiner.*